US012725591B2

(12) United States Patent
Maezawa

(10) Patent No.: US 12,725,591 B2
(45) Date of Patent: Sep. 1, 2026

(54) COMPUTER-IMPLEMENTED METHOD, SYSTEM, AND NON-TRANSITORY COMPUTER-READABLE STORAGE MEDIUM FOR INFERRING EVALUATION OF PERFORMANCE INFORMATION

(71) Applicant: Yamaha Corporation, Hamamatsu (JP)

(72) Inventor: Akira Maezawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 1021 days.

(21) Appl. No.: 17/946,176

(22) Filed: Sep. 16, 2022

(65) Prior Publication Data

US 2023/0009481 A1 Jan. 12, 2023

Related U.S. Application Data

(63) Continuation of application No. PCT/JP2021/003784, filed on Feb. 2, 2021.

(30) Foreign Application Priority Data

Mar. 17, 2020 (JP) ................................ 2020-046517

(51) Int. Cl.
*G10H 1/00* (2006.01)

(52) U.S. Cl.
CPC ......... *G10H 1/0058* (2013.01); *G10H 1/0008* (2013.01)

(58) Field of Classification Search
CPC .......................... G10H 1/0058; G10H 1/0008
(Continued)

(56) References Cited

U.S. PATENT DOCUMENTS 7,842,874 B2 * 11/2010 Jehan .................. G10H 1/0025 84/634
2014/0305287 A1 * 10/2014 Sasaki .................. G10H 1/0066 84/609
(Continued)

FOREIGN PATENT DOCUMENTS

CN 104112443 A * 10/2014 ........... G10H 1/0066
CN 110675879 A * 1/2020 ............. G06F 16/27
(Continued)

OTHER PUBLICATIONS

Chinese-language Office Action issued in Chinese Application No. 202180019706.0 dated May 31, 2024 with English translation (18 pages).
(Continued)

*Primary Examiner* — Christina M Schreiber
(74) *Attorney, Agent, or Firm* — Crowell & Moring LLP

(57) ABSTRACT

A computer-implemented method includes obtaining a trained model trained to store a relationship between first performance information and evaluation information. The first performance information includes a plurality of performance units. The evaluation information includes a plurality of pieces of evaluation information respectively associated with the plurality of performance units. The method also includes obtaining second performance information including an evaluation of each performance unit of the plurality of performance units. The method also includes processing the second performance information using the trained model to infer the evaluation of the each performance unit.

11 Claims, 5 Drawing Sheets

(58) Field of Classification Search
USPC ........................................................ 84/609
See application file for complete search history.

(56) References Cited

U.S. PATENT DOCUMENTS

| | | | | |
|---|---|---|---|---|
| 2016/0104469 | A1* | 4/2016 | Takahashi | G09B 15/00 84/609 |
| 2019/0164529 | A1* | 5/2019 | Kafuku | G06T 13/80 |
| 2021/0055905 | A1* | 2/2021 | Moldover | H04N 21/41407 |
| 2021/0150215 | A1* | 5/2021 | Zhang | G06N 3/0464 |
| 2022/0180767 | A1* | 6/2022 | Aharonson | G10G 3/04 |
| 2022/0414472 | A1* | 12/2022 | Maezawa | G10G 1/00 |
| 2023/0009481 | A1* | 1/2023 | Maezawa | G10H 1/0008 |
| 2023/0014315 | A1* | 1/2023 | Maezawa | G10H 1/0008 |
| 2023/0014736 | A1* | 1/2023 | Maezawa | G10H 1/0008 |

FOREIGN PATENT DOCUMENTS

| | | | | |
|---|---|---|---|---|
| EP | 3570271 A1 | * | 11/2019 | G10H 1/38 |
| JP | 2011-59309 A | | 3/2011 | |
| JP | 2011059309 A | * | 3/2011 | |
| WO | WO-2014189137 A1 | * | 11/2014 | G10G 1/00 |

OTHER PUBLICATIONS

Japanese-language Office Action issued in Japanese Application No. 2022-508116 dated Oct. 27, 2023 with English translation (10 pages).
Konishi, Y., et al., "Automatic Evaluation for Proficiency of Playing the Drum-Kit for Supporting Trainings", Journal of Electronics, Information and Communication Engineers, Mar. 1, 2011, pp. 549-559, vol. J94-D, No. 3 (21 pages).
Japanese-language Office Action issued in Japanese Application No. 2022-508116 dated Apr. 22, 2024, with English translation (2 pages).
International Search Report (PCT/ISA/210) issued in PCT Application No. PCT/JP2021/003784 dated Apr. 20, 2021 with English translation (five (5) pages).
Japanese-language Written Opinion (PCT/ISA/237) issued in PCT Application No. PCT/JP2021/003784 dated Apr. 20, 2021 (four (4) pages).

* cited by examiner

COMPUTER-IMPLEMENTED METHOD, SYSTEM, AND NON-TRANSITORY COMPUTER-READABLE STORAGE MEDIUM FOR INFERRING EVALUATION OF PERFORMANCE INFORMATION

CROSS-REFERENCE TO RELATED APPLICATIONS

The present application is a continuation application of International Application No. PCT/JP2021/003784, filed Feb. 2, 2021, which claims priority to Japanese Patent Application No. 2020-046517, filed Mar. 17, 2020. The contents of these applications are incorporated herein by reference in their entirety.

BACKGROUND

Field of the Invention

The embodiments disclosed herein relate to a computer-implemented method, a system, and a non-transitory computer-readable recording medium for inferring an evaluation of performance information.

Background

Electronic musical instruments, such as electronic pianos, electronic organs, and synthesizers, are widely used. When a user plays an electronic musical instrument, the user performs a performance operation with respect to the electronic musical instrument, and the performance operation is converted into performance information, such as a MIDI message.

WO2014/189137 proposes a technique for identifying a tendency of a performance performed by a player. Specifically, the technique includes comparing performance information indicating an actual performance performed by the player with reference information indicating a reference of the performance (correct performance).

By the technique proposed in WO2014/189137, a degree of divergence of an actual performance of a player from a correct performance is identified. That is, this technique does not identify a subjective evaluation of performance information. In order to realize a control suitable for the user's preference, it is necessary to infer the user's evaluation of performance information.

The present development has been made in view of the above-described circumstances. An example object of the present disclosure is to provide a computer-implemented method, a system, and a non-transitory computer-readable recording medium for appropriately inferring an evaluation of performance information.

SUMMARY

One aspect is a computer-implemented method that includes obtaining a trained model trained to store a relationship between first performance information and evaluation information. The first performance information includes a plurality of performance units. The evaluation information includes a plurality of pieces of evaluation information respectively associated with the plurality of performance units. The method also includes obtaining second performance information including an evaluation of each performance unit of the plurality of performance units. The method also includes processing the second performance information using the trained model to infer the evaluation of the each performance unit.

Another aspect is a system that includes a memory and at least one processor. The memory stores a program. The at least one processor is configured to execute the program stored in the memory to obtain a trained model trained to store a relationship between first performance information and evaluation information. The first performance information includes a plurality of performance units. The evaluation information includes a plurality of pieces of evaluation information respectively associated with the plurality of performance units. The at least one processor is configured to execute the program stored in the memory to obtain second performance information including an evaluation of each performance unit of the plurality of performance units. The at least one processor is configured to execute the program stored in the memory to process the second performance information using the trained model to infer the evaluation of the each performance unit.

Another aspect is a non-transitory computer-readable recording medium storing a program that, when executed by at least one computer, cause the computer to perform a method including obtaining a trained model trained to store a relationship between first performance information and evaluation information. The first performance information includes a plurality of performance units. The evaluation information includes a plurality of pieces of evaluation information respectively associated with the plurality of performance units. The method also includes obtaining second performance information including an evaluation of each performance unit of the plurality of performance units. The method also includes processing the second performance information using the trained model to infer the evaluation of the each performance unit.

The above-described aspect of the present disclosure ensures that an evaluation for performance information is appropriately inferred.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures.

DETAILED DESCRIPTION

The present development is applicable to a method, a system, and a non-transitory computer-readable recording medium for inferring an audience's evaluation of performance data.

Embodiments of the present disclosure will be described below by referring to the accompanying drawings. It is to be noted that each of the embodiments described below is a non-limiting exemplary configuration that embodies the present disclosure. It is also to be noted that each of the embodiments described below can be modified or changed in a manner suitable for the configuration of an apparatus and/or a device to which the present disclosure is applied and/or suitable for various conditions. It is also to be noted that not all elements of the combinations of elements described in the embodiments described below are essential for embodying the present disclosure; one or some of the elements can be omitted as deemed necessary. That is, the scope of the present disclosure will not be limited by the configurations described in the embodiments described below. It is also to be noted that the plurality of configurations described in the embodiments described below may be combined to form another configuration insofar as no contradiction occurs.

Figure 1:
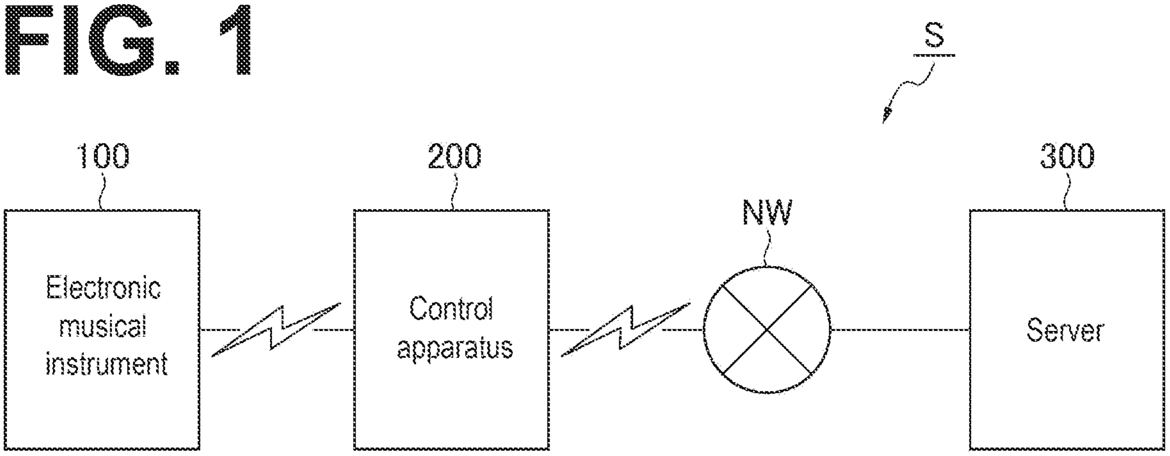
FIG. 1 is a diagram illustrating an overall configuration of an information processing system according to an embodiment of the present disclosure.

FIG. 1 is a diagram illustrating an overall configuration of an information processing system S according to an embodiment of the present disclosure. As illustrated in FIG. 1, the information processing system S according to this embodiment includes an electronic musical instrument 100, a control apparatus 200, and a server 300.

The electronic musical instrument 100 is a device used by a user to play a piece of music. For example, the electronic musical instrument 100 can be: an electronic keyboard instrument such as an electronic piano; an electronic stringed instrument such as an electric guitar; or an electronic wind instrument such as a wind synthesizer.

The control apparatus 200 is an apparatus used when a user performs an operation associated with setting of the electronic musical instrument 100. For example, the control apparatus 200 can be an information terminal such as a tablet terminal, a smartphone, and a personal computer (PC). The electronic musical instrument 100 and the control apparatus 200 are communicable with each other in a wireless or wired manner. It is to be noted that the control apparatus 200 and the electronic musical instrument 100 may be integral to each other.

The server 300 is a cloud server that transmits and receives data to and from the control apparatus 200, and is communicable with the control apparatus 200 via a network NW. The server 300 will not be limited to a cloud server; the server 300 may be a server on a local network. The functions of the server 300 according to this embodiment may be implemented by a cloud server cooperating with a server on a local network.

In the information processing system S according to this embodiment, performance information A, which is an inference target, is input into a trained model M. The performance information A includes a plurality of phrases F (performance units). The trained model M is a trained model that has been trained by machine learning to store a relationship between the performance information A and evaluation information B. The evaluation information B is associated with the plurality of phrases F. By inputting the performance information A into the trained model M, an evaluation of each of the plurality of phrases F included in the input performance information A is inferred. The server 300 trains the trained model M by machine-learning processing, and the control apparatus 200 performs inference processing using the trained model M.

Figure 2:
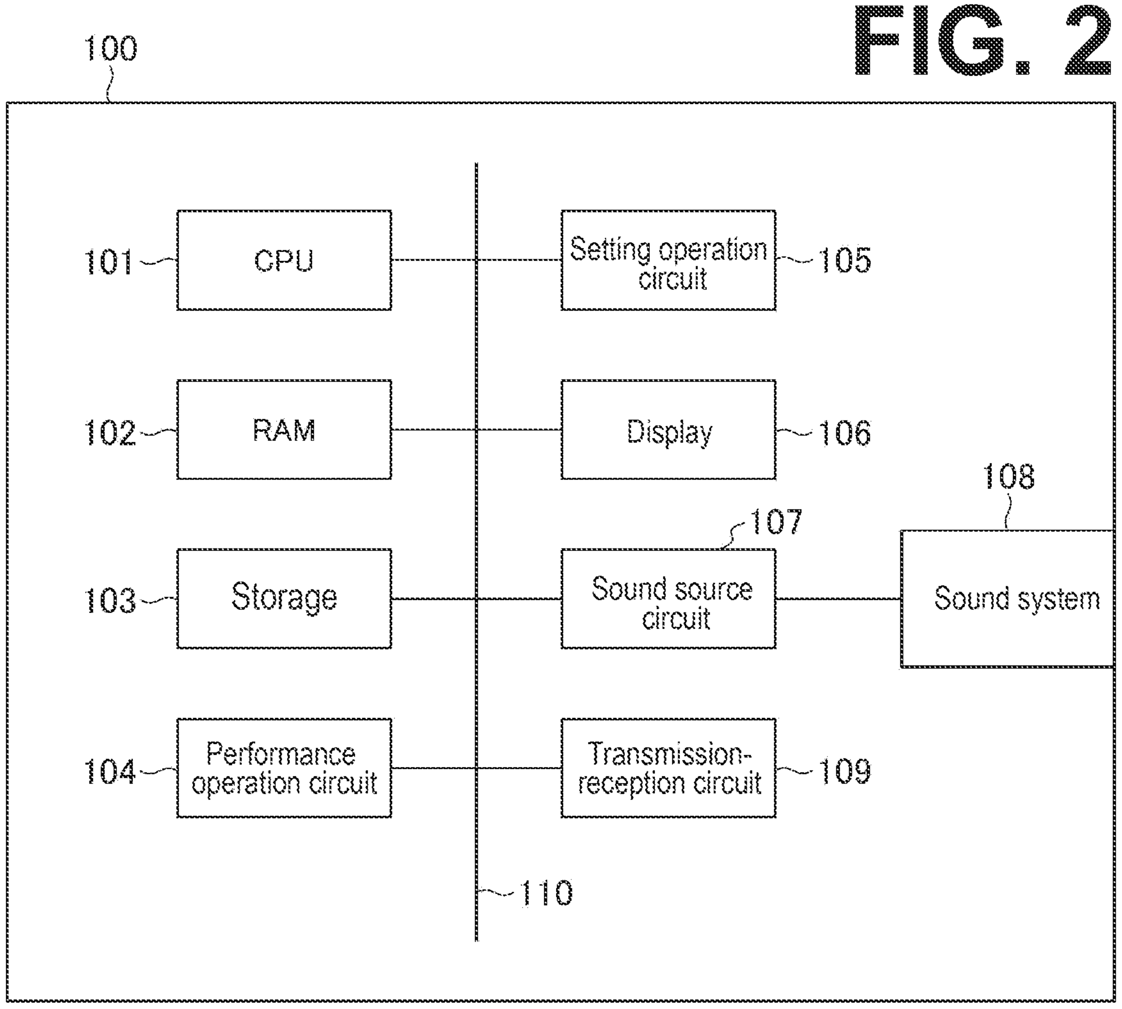
FIG. 2 is a block diagram illustrating a hardware configuration of an electronic musical instrument according to the embodiment of the present disclosure.

FIG. 2 is a block diagram illustrating a hardware configuration of the electronic musical instrument 100. As illustrated in FIG. 2, the electronic musical instrument 100 includes a central processing circuit (CPU) 101, a random access memory (RAM) 102, a storage 103, a performance operation circuit 104, a setting operation circuit 105, a display 106, a sound source circuit 107, a sound system 108, a transmission-reception circuit 109, and a bus 110.

The CPU 101 is a processing circuit that performs various operations and/or computations in the electronic musical instrument 100. The RAM 102 is a volatile recording medium that stores setting values used by the CPU 101 and functions as a working memory in which various programs are developed. The storage 103 is a non-volatile recording medium and stores various programs and data used by the CPU 101.

The performance operation circuit 104 is a component that: receives a performance operation corresponding to a performance of a piece of music performed by a user; generates performance operation information (for example, MIDI information) indicating the piece of music; and supplies the performance operation information to the CPU 101. For example, the performance operation circuit 104 can be an electronic keyboard.

The setting operation circuit 105 is a component that: receives a setting operation from a user; generates operation data; and supplies the operation datum to the CPU 101. For example, the setting operation circuit 105 can be an operation switch.

The display 106 is a component that displays various kinds of information such as musical instrument setting information. For example, the display 106 transmits a video signal to the display of the electronic musical instrument 100.

The sound source circuit 107 generates a sound signal based on the performance operation information supplied from the CPU 101 and based on parameters that have been set. Then, the sound source circuit 107 inputs the sound signal into the sound system 108.

The sound system 108 is made up of an amplifier and a speaker, and generates sound corresponding to the sound signal input from the sound source circuit 107.

The transmission-reception circuit 109 is a component that transmits and receives data to and from the control apparatus 200. For example, the transmission-reception circuit 109 can be a Bluetooth (registered trademark) module used for short-range wireless communication.

The bus 110 is a signal transmission path (system bus) that connects the hardware components of the electronic musical instrument 100 to each other.

Figure 3:
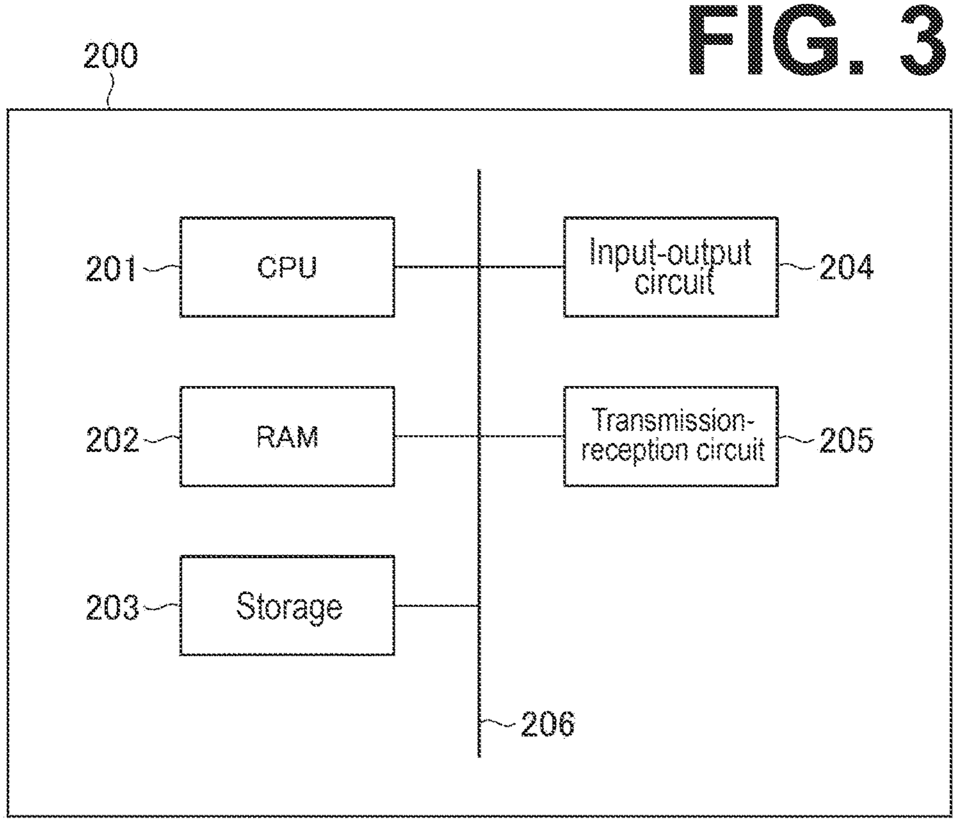
FIG. 3 is a block diagram illustrating a hardware configuration of a control apparatus according to the embodiment of the present disclosure.

FIG. 3 is a block diagram illustrating a hardware configuration of the control apparatus 200. As illustrated in FIG. 3, the control apparatus 200 includes a CPU 201, a RAM 202, a storage 203, an input-output circuit 204, a transmission-reception circuit 205, and a bus 206.

The CPU 201 is a processing circuit that performs various operations and/or computations in the control apparatus 200. The RAM 202 is a volatile recording medium and stores setting values used by the CPU 201. The RAM 202 also functions as a working memory in which various programs are developed. The storage 203 is a non-volatile recording medium and stores various programs and data used by the CPU 201.

The input-output circuit 204 is a component (user interface) that: receives an operation made by a user with respect to the control apparatus 200; and displays various kinds of information. For example, the input-output circuit 204 can be a touch panel.

The transmission-reception circuit 205 is a component that transmits and receives data to and from other apparatuses and/or devices (such as the electronic musical instrument 100 and the server 300). The transmission-reception circuit 205 may include a plurality of modules. For example, the plurality of modules may include a Bluetooth (registered trademark) module for short-range wireless communication performed with the electronic musical instrument 100. For example, the plurality of modules may include a Wi-Fi (registered trademark) module for communication with the server 300.

The bus 206 is a signal transmission path that connects the hardware components of the control apparatus 200 to each other.

Figure 4:
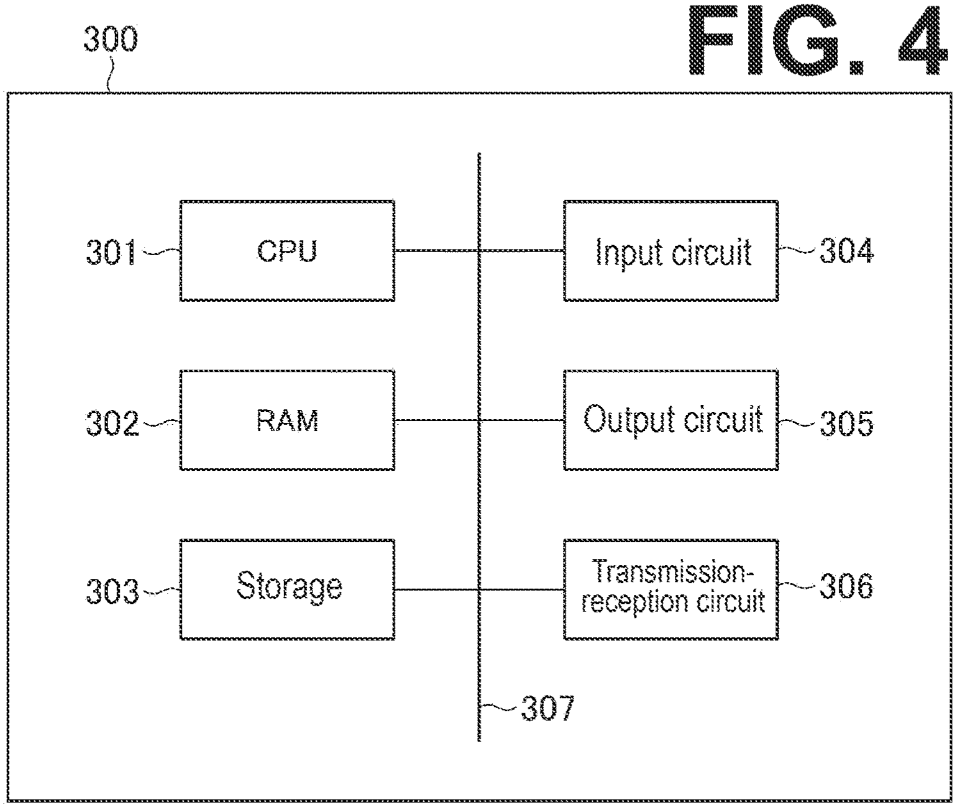
FIG. 4 is a block diagram illustrating a hardware configuration of a server according to the embodiment of the present disclosure.

FIG. 4 is a block diagram illustrating a hardware configuration of the server 300. As illustrated in FIG. 4, the sever 300 includes a CPU 301, a RAM 302, a storage 303, an input circuit 304, an output circuit 305, a transmission-reception circuit 306, and a bus 307.

The CPU 301 is a processing circuit that performs various operations in the server 300. The RAM 302 is a volatile recording medium storing setting values used by the CPU 301, and functions as a working memory in which various programs are developed. The storage 303 is a non-volatile recording medium and stores various programs and data used by the CPU 301.

The input circuit 304 is a component that receives an operation made with respect to the server 300. For example, the input circuit 304 receives an input signal from a keyboard and a mouse that are connected to the server 300.

The output circuit 305 is a component that displays various kinds of information. For example, the output circuit 305 outputs a video signal to a liquid-crystal display connected to the server 300.

The transmission-reception circuit 306 is a component that transmits and receives data to and from the control apparatus 200. For example, the transmission-reception circuit 306 can be a network interface card (NIC).

The bus 307 is a signal transmission path that connects the hardware components of the server 300 to each other.

The CPU 101, 201, or 301 of the device 100, 200, or 300 reads a program stored in the storage 103, 203, or 303 into the RAM 102, 202, or 303, and executes the program. By executing the program, the following functional blocks (such as control circuits 150, 250, and 350) and various processes according to this embodiment are implemented. It is to be noted that each of the above-described CPUs may be a single core, or multiple cores of the same or different architectures. each CPU is not limited to a typical CPU; each CPU may be a digital signal processor (DSP), an inference processor, or a combination of two or more of these processors. It is also to be noted that the various processes according to this embodiment may be implemented by executing programs using at least one processor such as a CPU, a DSP, an inference processor, and a graphics processing circuit (GPU).

Figure 5:
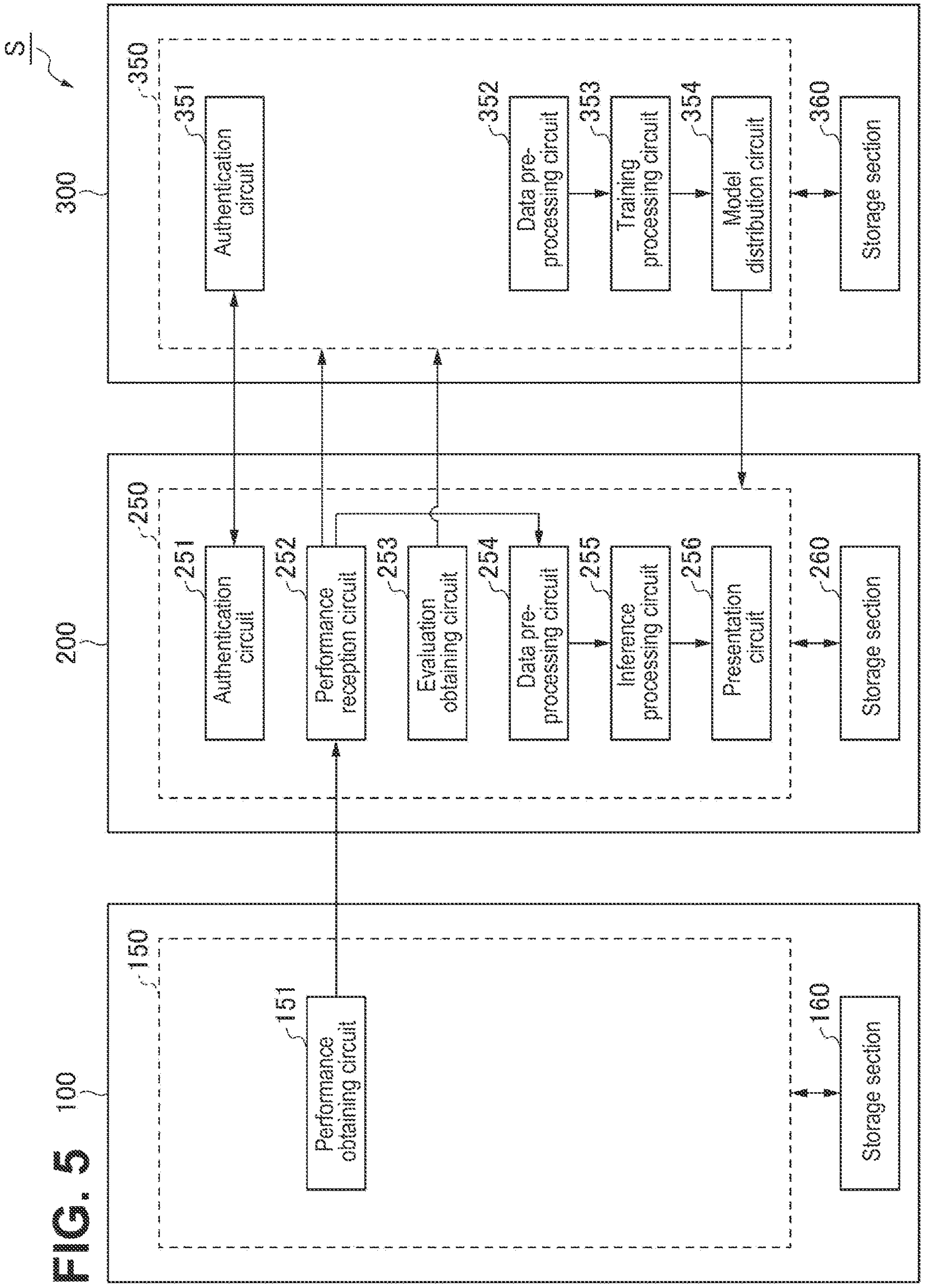
FIG. 5 is a block diagram illustrating a functional configuration of the information processing system according to the embodiment of the present disclosure.

FIG. 5 is a block diagram illustrating a functional configuration of the information processing system S according to this embodiment of the present disclosure.

The electronic musical instrument 100 includes a control section 150 and a storage section 160. The control section 150 is a functional block that integrally controls the operation of the electronic musical instrument 100. The storage section 160 is made up of the RAM 102 and the storage 103, and stores various kinds of information used by the control section 150. The control section 150 includes a performance obtaining circuit 151 as a sub-functional block.

The performance obtaining circuit 151 is a functional block that obtains performance operation information generated by the performance operation circuit 104 based on a user's performance operation. The performance operation information is information indicating a sound generation timing and a pitch of each of a plurality of sounds performed by the user. The performance operation information may also include information indicating the length and/or the intensity of each sound. That is, the performance obtaining circuit 151 supplies the obtained performance operation information to the sound source circuit 107 and also to the control apparatus 200 (performance reception circuit 252) via the transmission-reception circuit 109.

The control apparatus 200 includes a control section 250 and a storage section 260. The control section 250 is a functional block that integrally controls the operation of the control apparatus 200. The storage section 260 includes the RAM 202 and the storage 203, and stores various kinds of information used by the control section 250. The control section 250 includes, as sub-functional blocks, an authentication circuit 251, the performance reception circuit 252, an evaluation obtaining circuit 253, a data pre-processing circuit 254, an inference processing circuit 255, and a presentation circuit 256.

The authentication circuit 251 is a functional block that cooperates with the server 300 (server authentication circuit 351) to authenticate a user. The authentication circuit 251 receives authentication information, such as a user identifier and a password, from the user via the input-output circuit 204. Then, the authentication circuit 251 transmits the authentication information to the server 300, and receives an authentication result from the server 300. Based on the authentication result, the authentication circuit 251 permits or rejects access of the user. The authentication circuit 251 is capable of supplying the user identifier of the authenticated user (access-permitted user) to other functional blocks.

The performance reception circuit 252 is a functional block that: receives performance operation information supplied from the electronic musical instrument 100 (performance obtaining circuit 151); divides the performance operation information into a plurality of phrases F, each of which is a musical performance unit; and obtains performance information A. The performance information A includes the plurality of phrases F. The performance reception circuit 252 is capable of dividing a piece of music indicated by the performance operation information into a plurality of phrases F using an arbitrary phrase detection method. An example of the phrase detection method can be based on continuous breaks in a performance. Another example of the phrase detection method can be based on a melody pattern. Another example of the phrase detection method can be based on a chord progression pattern. Another example of the phrase detection method can be a combination of two or more phrase detection methods. Another example of the phrase detection method can be rule-based. Another example of the phrase detection method can be performed using a neural network. The performance information A is information indicating a sound generation timing and a pitch of each of a plurality of sounds included in the phrase F, and is high-dimensional time-series data representing a performance of a piece of music performed by the user.

The performance reception circuit 252 stores the obtained performance information A in the storage section 260 or supplies the obtained performance information A to the data pre-processing circuit 254. It is to be noted that the performance reception circuit 252 is capable of adding the user identifier supplied from the authentication circuit 251 to the performance information A and storing the performance information A in the storage section 260. The performance reception circuit 252 also transmits the performance information A to which the user identifier is assigned to the server 300 via the transmission-reception circuit 205.

The evaluation obtaining circuit 253 is a functional block that generates evaluation information B. The evaluation information B is information indicating an evaluation of a phrase F input by the user. The user may give an evaluation to each phrase F included in the performance information A by operating the input-output circuit 204. The evaluation may be given in parallel with the performance of the piece of music (in other words, in parallel with obtaining of the performance information A), or may be given after completion of the performance of the piece of music. That is, the evaluation by the user may be a real-time evaluation or a post-performance evaluation. The evaluation information B is data associated with the plurality of phrases F. Each of the data includes identification data for identifying a phrase F and an evaluation label indicating an evaluation of the phrase F. The evaluation label may be a value indicating a five-level evaluation (for example, the number of stars). The identification data will not be limited to data directly specifying a phrase F; the identification data may be an absolute time or a relative time associated with the phrase F.

The evaluation obtaining circuit 253 stores the generated evaluation information B in the storage section 260. It is to be noted that the evaluation obtaining circuit 253 may add the user identifier supplied from the authentication circuit 251 to the evaluation information B, and store the evaluation information B in the storage section 260. The evaluation obtaining circuit 253 transmits the evaluation information B to which the user identifier is assigned to the server 300 via the transmission-reception circuit 205.

The data pre-processing circuit 254 is a functional block that pre-processes the performance information A stored in the storage section 260 or the performance information A supplied from the performance reception circuit 252. For example, the data pre-processing circuit 254 performs scaling with respect to the performance data A to change the performance data A into a format suitable for inference by the trained model M.

The inference processing circuit 255 is a functional block that infers the evaluation of each phrase F included in the performance information A by inputting the pre-processed performance information A (the plurality of phrases F) as input data into the trained model M trained by a training processing circuit 353, described later. The trained model M according to this embodiment may be any machine trained model. For example, the trained model M can be a recurrent neural network (RNN) adapted to time-series data and a derivative of the RNN (for example, long short-term memory (LSTM) or gated recurrent unit (GRU)).

The presentation circuit 256 is a functional block that presents information about a musical lesson to the user based on the evaluation of each phrase F inferred by the inference processing circuit 255. The presentation circuit 256 causes, for example, the input-output circuit 204 to display information indicating a part to be practiced selected based on the evaluation of each phrase F. The presentation circuit 256 may also display this information on the display 106 of the electronic musical instrument 100 or on a display of some other device or apparatus.

The server 300 includes a control section 350 and a storage section 360. The control section 350 is a functional block that integrally controls the operation of the server 300. The storage section 360 is made up of the RAM 302 and the storage 303, and stores various information used by the control section 350 (particularly, the performance information A and the assessment information B supplied from the control apparatus 200). It is preferable that the storage section 360 stores the performance information A and the evaluation information B generated as a result of a plurality of users using each user's electronic musical instrument 100 and control apparatus 200. The control section 350 includes, as sub-functional blocks, the server authentication circuit 351, a data pre-processing circuit 352, the training processing circuit 353, and a model distribution circuit 354.

The server authentication circuit 351 is a functional block that cooperates with the control apparatus 200 (authentication circuit 251) to authenticate a user. The server authentication circuit 351 determines whether the authentication information supplied from the control apparatus 200 matches the authentication information stored in the storage section 360. Then, the server authentication circuit 351 transmits an authentication result (permission or rejection) to the control apparatus 200.

The data pre-processing circuit 352 is a functional block that pre-processes the performance information A and the evaluation information B stored in the storage section 360. For example, the data pre-processing circuit 352 performs scaling with respect to the performance information A and the evaluation information B to change the performance information A and the evaluation information B into a format suitable for the training (machine learning) of the trained model M.

The training processing circuit 353 is a functional block that trains the trained model M for the specific user indicated by the user identifier assigned to the performance information A and the evaluation information B. In order to train the trained model M, the training processing circuit 353 refers to the user identifier assigned to the performance information A and the evaluation information B; uses, as input data, the performance information A (the plurality of phrases F) that has been pre-processed; and uses, as teacher data, the evaluation information B that has been pre-processed. It is preferable to use, as initial data of the trained model M for the specific user, a base trained model trained using a large number of pieces of performance information A and evaluation information B associated with users other than the specific user. This is because the amount of information that a single user can generate is generally limited and relatively small.

The model distribution circuit 354 is a functional block that supplies the trained model M trained by the training processing circuit 353 to the control apparatus 200 of the specific user indicated by the user identifier.

Figure 6:
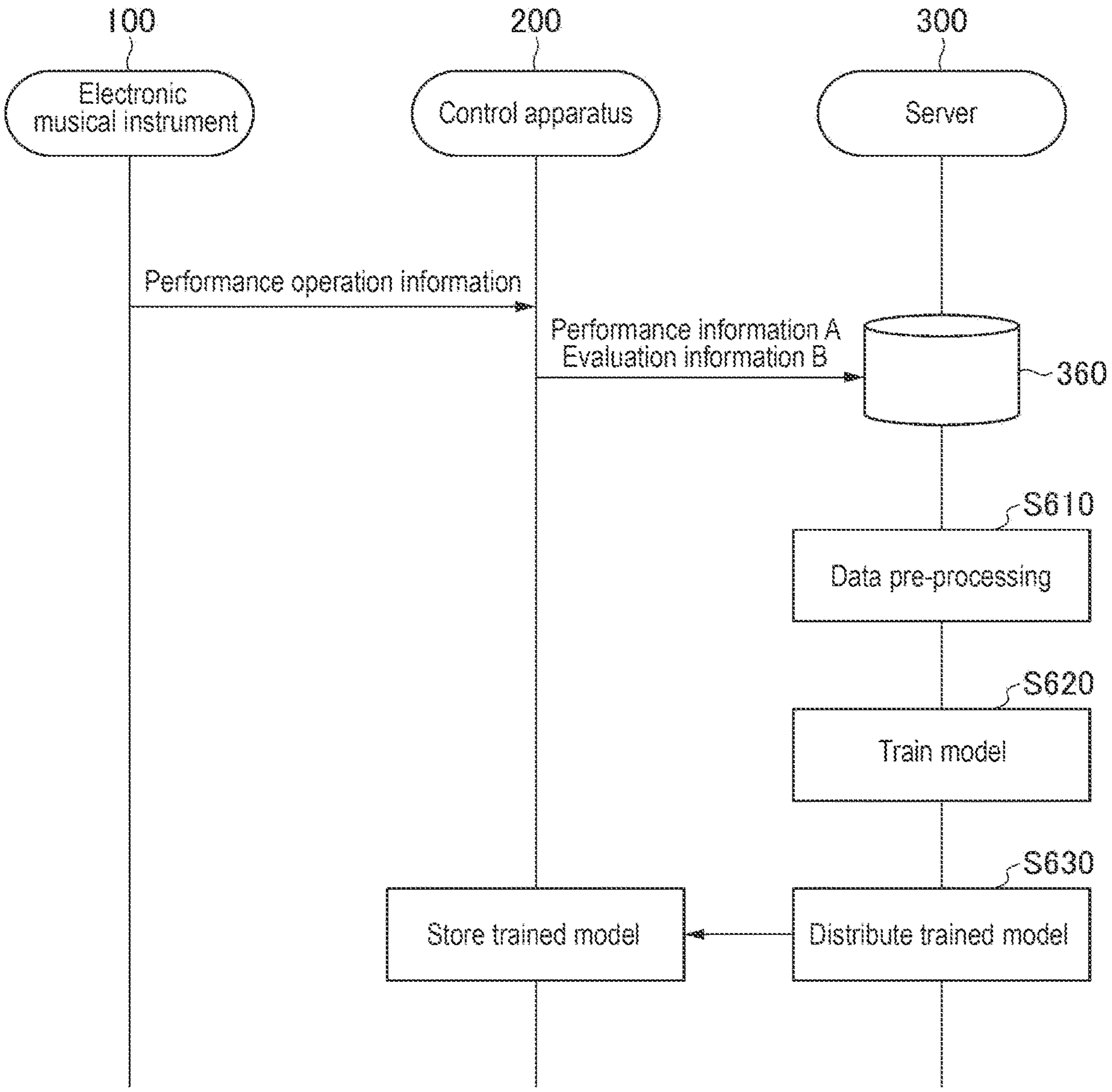
FIG. 6 is a sequence diagram illustrating machine-learning processing according to the embodiment of the present disclosure.

FIG. 6 is a sequence diagram illustrating machine-learning processing performed in the information processing system S according to this embodiment of the present disclosure. This machine-learning processing is for a specific user indicated by a user identifier. The machine-learning processing according to this embodiment is performed by the CPU 301 of the server 300. It is to be noted that the machine-learning processing according to this embodiment may be performed periodically or may be executed in response to a request from the user (the control apparatus 200).

At step S610, the data pre-processing circuit 352 reads a dataset stored in the storage section 360. The dataset includes the performance information A and the assessment information B associated with the user indicated by the user identifier. Then, the data pre-processing circuit 352 pre-processes the dataset.

At step S620, the training processing circuit 353 trains the trained model M based on the dataset pre-processed at step S610. Specifically, the training processing circuit 353 uses, as input data, the performance information A, which includes the plurality of phrases F; and uses, as teaching data, the assessment information B, which is associated with the plurality of phrases F. Then, the training processing circuit 353 stores the trained model M in the storage section 360. In this example, the trained model M is trained to estimate the evaluation information B of the user indicated by the user identifier with respect to the performance information A of an unknown phrase. For example, when the trained model M is a neural network system, the training processing circuit 353 may perform machine learning of the trained model M using a method such as backpropagation.

At step S630, the model distribution circuit 354 supplies the trained model M trained at step S620 to the control apparatus 200 via the network NW. The control section 250 of the control apparatus 200 stores the received trained model M in the storage section 260.

Figure 7:
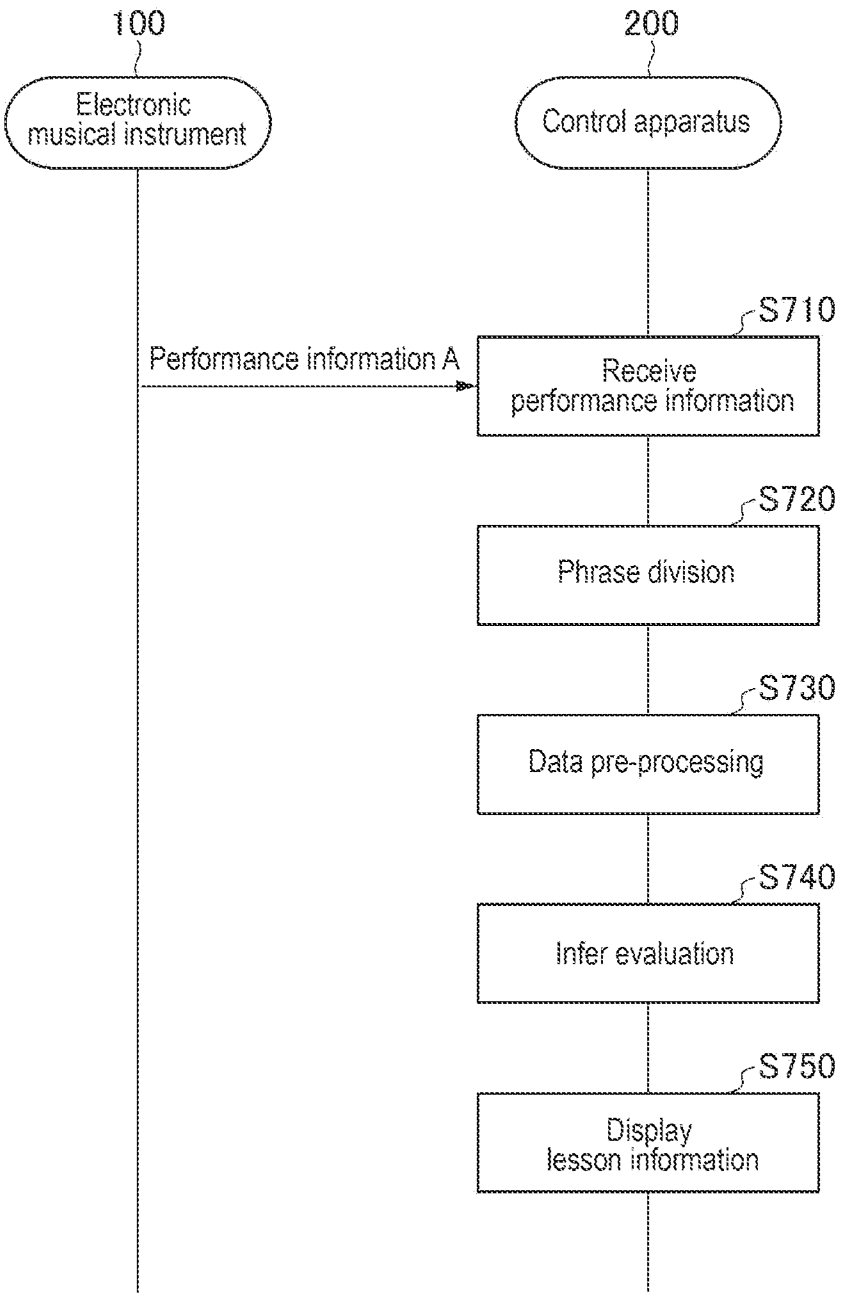
FIG. 7 is a sequence diagram illustrating inference presentation processing according to the embodiment of the present disclosure.

FIG. 7 is a sequence diagram illustrating an inference presentation processing performed in the information processing system S according to this embodiment of the present disclosure. The inference presentation processing is for a specific user indicated by a user identifier. In this embodiment, the control apparatus 200 infers an evaluation of each phrase F. Then, based on the inferred evaluation, the control apparatus 200 presents information regarding a musical lesson to the user.

At step S710, the performance reception circuit 252 receives, from the electronic musical instrument 100 of the user, performance operation information obtained by the performance obtaining circuit 151. Then, the performance reception circuit 252 assigns a user identifier to the performance operation information. It is to be noted that the performance reception circuit 252 may read performance operation information that the performance reception circuit 252 has received from the electronic musical instrument 100 of the user in the past, assigned a user identifier, and stored in the storage section 260.

At step S720, the performance reception circuit 252 divides the received performance operation information into phrases F, which are performance units. In this manner, the performance reception circuit 252 obtains performance information A, with the plurality of phrases F. Then, the performance reception circuit 252 supplies the performance information A to the data pre-processing circuit 254.

At step S730, the data pre-processing circuit 254 pre-processes the performance information A supplied from the performance reception circuit 252 at step S720, and supplies the pre-processed performance information A to the inference processing circuit 255.

At step S740, the inference processing circuit 255 inputs the performance information A which has been supplied from the data pre-processing circuit 254 and includes the plurality of phrases F, into the trained model M stored in the storage section 260. The trained model M infers (estimates) the user's evaluation of each of the plurality of phrases F included in the input performance information A. An inference value indicating each evaluation may be a discrete value or a continuous value. The inferred evaluation of each phrase F is supplied to the presentation circuit 256.

At step S750, the presentation circuit 256 causes the input-output circuit 204 to display information about a musical lesson based on the user's evaluation of each phrase F inferred by the inference processing circuit 255 at step S740. Preferably, the presentation circuit 256 presents each phrase F to the user such that as the inferred evaluation of the each phrase F is a higher level evaluation, the each phrase F is presented as a more frequently practiced phrase.

The presentation circuit 256 may also select a predetermined number of phrases F from the plurality of phrases F such that the predetermined number of phrases F are aligned in descending order of the inferred evaluation; and present the predetermined number of phrases F to the user. These plurality of presentation-candidate practice phrases may be stored in the storage section 260 or may be registered in a database included in an external apparatus or device such as a distribution server. For example, the practice phrase can be a phrase indicating a basic practice necessary for realizing a musical feature (such as scale and arpeggio) in the phrase F. Also, the practice phrase will not be limited to a phrase indicating a basic practice. For example, a plurality of practice phrases corresponding to a performance grade(s) may be registered in the storage section 260 or a database of an external apparatus or device.

As has been described hereinbefore, in the information processing system S according to this embodiment, a user's evaluation of each of a plurality of phrases F included in the performance information A is appropriately inferred by the trained model M. The control apparatus 200 presents information about a musical lesson to the user based on the inferred evaluation of each phrase F. As a result, a user is provided with a lesson associated with a phrase F that is inferred to be highly evaluated by the user. By taking such lesson, the user is able to develop a technique for better playing the highly evaluated phrase.

Also in this embodiment, the trained model M is trained for each individual user identified by a user identifier and supplied from the server 300. This configuration ensures that even if a user replaces the user's electronic musical instrument 100 or control apparatus 200, the user is able to continue using the trained model M adapted to the user.

MODIFICATIONS

The above-described embodiment may be modified in various manners, some of which will be described below. Two or more aspects arbitrarily selected from the above-described embodiment and the following examples can be appropriately combined insofar as they do not contradict each other.

In the above-described embodiment, an inferred evaluation may be used to present information about a musical lesson. An inferred evaluation may be used in any other application.

For example, based on the inferred evaluation, the control apparatus 200 may present, to a user, a song that the user is likely to prefer. More specifically, the presentation circuit 256 of the control apparatus 200 may present, to a user, music including phrases similar to a predetermined number of phrases selected in descending order of inferred evaluation.

The control apparatus 200 may also automatically select, as a theme, a highly evaluated phrase F included in the performance information A, and perform an automatic composition by developing the selected phrase F based on, for example, chord progression. In a possible configuration, the control apparatus 200 may function as a performance agent that performs an improvisation based on a user's performance. In this configuration, the control apparatus 200 may select, from among a plurality of automatically generated candidate phrases, a phrase for which a high evaluation has been inferred; and output this phrase.

In the above-described embodiment, a plurality of phrases F included in a piece of music are used as performance units. Any time-series element, however, may be used as a performance unit. For example, a plurality of performance sections obtained by dividing a piece of music at predetermined time intervals may be used as performance units.

The performance information A and the evaluation information B, which are used for training (machine-learning) the trained model M by the training processing circuit 353 of the server 300, may be information obtained from a single user who uses the trained model M or may be information obtained from a plurality of users. The trained model M may also be trained using performance information A and evaluation information B that are obtained from a plurality of users having a common attribute. For example, the trained model M may be trained using information obtained from users having the same number of years of playing experience or users who belong to classrooms of the same grade.

The training processing circuit 353 of the server 300 may apply additional training to the trained model M. That is, the training processing circuit 353 may train the trained model M using performance information A and evaluation information B that have been obtained from a plurality of users, and then perform fine tuning on the trained model M using performance information A and evaluation information B that have been obtained from a specific single user.

In the above-described embodiment, the control apparatus 200 infers an evaluation of each phrase F using the trained model M supplied from the server 300. However, an evaluation may be inferred at any point. For example, the server 300 may pre-process the performance information A supplied from the control apparatus 200 and input, as input data, the pre-processed performance information A into the trained model M stored in the storage section 360, thereby inferring an evaluation of each phrase F included in the performance information A. This modification ensures that the server 300 is able to perform inference processing using the trained model M with the performance information A as input data. As a result, the processing load on the control apparatus 200 is reduced.

In the above-described embodiment, the performance information A is generated by the performance reception circuit 252 that has received, from the electronic musical instrument 100, performance operation information indicating an operation of a piece of music. The performance information A, however, may be generated by any method and at any point. For example, the performance reception circuit 252 may generate performance information A by performing analysis (pitch analysis, audio analysis, or phrase analysis) of sound information (waveform data generated by performance of a piece of music), instead of performance operation information.

In the above-described embodiment, the evaluation information B is generated by the evaluation obtaining circuit 253 of the control apparatus 200 based on an instruction operation made by the user with respect to the input-output circuit 204. The evaluation information B, however, may be generated in any manner and at any point. For example, a functional block corresponding to the evaluation obtaining circuit 253 may be provided in the control section 150 of the electronic musical instrument 100, and this functional block may generate the evaluation information B based on an operation performed by the user with respect to the setting operation circuit 105 (an example of which is an evaluation button).

In the machine-learning processing and the inference processing performed in the above-described embodiment, information other than the performance information A may be further input as input data. For example, accompanying information may be input into the trained model M together with the performance information A. The accompanying information indicates an accompanying operation (such as a pedal operation of an electronic piano, and an effector operation of an electric guitar) that accompanies a performance of a piece of music performed using the electronic musical instrument 100. The accompanying information is preferably further obtained by the performance obtaining circuit 151 and added to the performance information A.

The electronic musical instrument 100 according to the above-described embodiment may have the functions of the control apparatus 200, or the control apparatus 200 according to the above-described embodiment may have the functions of the electronic musical instrument 100.

It is to be noted that software control programs for implementing the present disclosure may be stored in a non-transitory computer-readable recording medium, and that the effects of the present disclosure may be achieved by reading the software control programs into any of the above-described apparatus(es), device(s), and/or circuit(s). In this case, the program codes read from the recording medium realize the novel functions of the present disclosure, and the non-transitory computer-readable recording medium storing the program codes constitutes the present disclosure. Further, the program codes may be supplied via a transmission medium. In this case, the program codes themselves constitute the present disclosure. In these cases, the recording medium can be a ROM, a floppy disk, a hard disk, an optical disk, a magneto-optical disk, a CD-ROM, a CD-R, a magnetic tape, or a nonvolatile memory card. The "non-transitory computer-readable recording medium", as used herein, encompasses a medium that holds a program for a certain period of time. For example, such medium can be a volatile memory (for example, a dynamic random access memory (DRAM)) disposed inside a computer system serving as a server or a client when a program is transmitted via a network such as the Internet or a communication line such as a telephone line.

While an embodiment of the present disclosure and modifications of the embodiment have been described, the embodiment and the modifications are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiment and the modifications. Thus, these embodiment and modifications thereof are intended to be encompassed by the scope of the present disclosure. The scope of the present invention accordingly is to be defined as set forth in the appended claims.

What is claimed is:

1. A computer-implemented method comprising:

obtaining, by at least one processor, a trained model trained to store a relationship between first performance information and evaluation information, the first performance information comprising a plurality of performance units relating to a piece of music, the evaluation information comprising a plurality of pieces of evaluation information respectively associated with the plurality of performance units;

obtaining, by the at least one processor, second performance information comprising an evaluation of each performance unit of the plurality of performance units; and processing, by the at least one processor, the second performance information using the trained model to infer the evaluation of the each performance unit, wherein the each performance unit corresponds to each phrase of a plurality of phrases included in the piece of music, wherein the first performance information and the second performance information indicates a sound characteristic of each of a plurality of sounds included in the each performance unit, wherein the evaluation information comprises an evaluation label indicating the evaluation of the each phrase, wherein the method further comprises:

selecting by the at least one processor, a predetermined number of phrases from the plurality of phrases in a defined order based on a level of the evaluation of the predetermined number of phrases; and presenting by the at least one processor, the predetermined number of phrases to a user as practice phrases.

2. The method according to claim 1, wherein the each performance unit corresponds to each phrase of a plurality of phrases included in the piece of music, and wherein the evaluation information comprises an evaluation label indicating the evaluation of the each phrase.

3. The method according to claim 2, wherein the evaluation information further comprises identification data for identifying the each phrase.

4. The method according to claim 1, wherein the evaluation information further comprises identification data for identifying the each phrase.

5. The method according to claim 1, further comprising presenting the each phrase to a user such that, as the evaluation of the each phrase is a higher level evaluation, the each phrase is presented as a practice phase to be practiced more frequently.

6. A system comprising:

a memory storing a program; and at least one processor configured to execute the program stored in the memory to:

obtain a trained model trained to store a relationship between first performance information and evaluation information, the first performance information comprising a plurality of performance units relating to a first piece of music, the evaluation information comprising a plurality of pieces of evaluation information respectively associated with the plurality of performance units;

obtain second performance information comprising an evaluation of each performance unit of the plurality of performance units; and process the second performance information using the trained model to infer the evaluation of the each performance unit, wherein the each performance unit corresponds to each phrase of a plurality of phrases included in the first piece of music, wherein the first performance information and the second performance information indicates a sound characteristic of each of a plurality of sounds included in the each performance unit, wherein the evaluation information comprises an evaluation label indicating the evaluation of the each phrase, wherein the at least one processor is further configured to execute the program stored in the memory to:

select a predetermined number of phrases from the plurality of phrases in a defined order based on a level of the evaluation of the predetermined number of phrases; and present a second piece of music including phrases similar to the predetermined number of phrases.

7. The system according to claim 6, wherein the each performance unit corresponds to each phrase of a plurality of phrases included in the first piece of music, and wherein the evaluation information comprises an evaluation label indicating the evaluation of the each phrase.

8. The system according to claim 6, wherein the evaluation information comprises identification data for identifying the each phrase.

9. The system according to claim 6, wherein the at least one processor is configured to execute the program stored in the memory to present the each phrase to a user such that, as the evaluation of the each phrase is a higher level evaluation, the each phrase is presented as a practice phase to be practiced more frequently.

10. A computer-implemented method comprising:

obtaining, by at least one processor, a trained model trained to store a relationship between first performance information and evaluation information, the first performance information comprising a plurality of performance units relating to a first piece of music, the evaluation information comprising a plurality of pieces of evaluation information respectively associated with the plurality of performance units;

obtaining, by the at least one processor, second performance information comprising an evaluation of each performance unit of the plurality of performance units; and processing, by the at least one processor, the second performance information using the trained model to infer the evaluation of the each performance unit, wherein the each performance unit corresponds to each phrase of a plurality of phrases included in the first piece of music, wherein the first performance information and the second performance information indicates a sound characteristic of each of a plurality of sounds included in the each performance unit, wherein the evaluation information comprises an evaluation label indicating the evaluation of the each phrase, wherein the method further comprises:

selecting, by the at least one processor, a predetermined number of phrases from the plurality of phrases in a defined order based on a level of the evaluation of the predetermined number of phrases; and presenting, by the at least one processor, a second piece of music including phrases similar to the predetermined number of phrases.

11. A system comprising:

a memory storing a program; and at least one processor configured to execute the program stored in the memory to:

obtain a trained model trained to store a relationship between first performance information and evaluation information, the first performance information comprising a plurality of performance units relating to a piece of music, the evaluation information comprising a plurality of pieces of evaluation information respectively associated with the plurality of performance units;

obtain second performance information comprising an evaluation of each performance unit of the plurality of performance units; and process the second performance information using the trained model to infer the evaluation of the each performance unit, wherein the each performance unit corresponds to each phrase of a plurality of phrases included in the piece of music, wherein the first performance information and the second performance information indicates a sound characteristic of each of a plurality of sounds included in the each performance unit, wherein the evaluation information comprises an evaluation label indicating the evaluation of the each phrase, wherein the at least one processor is further configured to execute the program stored in the memory to:

select a predetermined number of phrases from the plurality of phrases in a defined order based on a level of the evaluation of the predetermined number of phrases; and present the predetermined number of phrases to a user as practice phrases.

* * * * *